United States Patent [19]
Suyama

[11] Patent Number: 5,903,076
[45] Date of Patent: May 11, 1999

[54] VIBRATION ACTUATOR FOR PAGER

[75] Inventor: Hideo Suyama, Sendai, Japan

[73] Assignee: A.C.E. Tech Co., Ltd., Miyagi, Japan

[21] Appl. No.: 08/800,275

[22] Filed: Feb. 13, 1997

[30] Foreign Application Priority Data

Feb. 20, 1996 [JP] Japan ................................ 8-031919

[51] Int. Cl.⁶ .......................... H04R 25/00; G08B 5/22
[52] U.S. Cl. .................... 310/81; 310/13; 340/384.73; 381/152; 381/192
[58] Field of Search ................... 310/81, 12, 13, 310/15, 17, 20, 27; 340/384.73, 311.1, 388.1, 388.2, 825.44, 401.1, 407.1; 381/152, 194, 192, 86

[56] References Cited

U.S. PATENT DOCUMENTS

| | | | |
|---|---|---|---|
| 488,012 | 12/1892 | Matsuda et al. | 179/115.5 R |
| 4,234,766 | 11/1980 | Cacho | 179/115.5 R |
| 4,507,800 | 3/1985 | Kelly | 381/88 |
| 4,817,152 | 3/1989 | Lee | 381/24 |
| 4,839,494 | 6/1989 | Vuple | 219/10.55 R |
| 5,091,959 | 2/1992 | Sohn et al. | 381/165 |
| 5,107,540 | 4/1992 | Mooney et al. | 381/192 |
| 5,172,092 | 12/1992 | Nguyen et al. | 340/311.1 |
| 5,181,253 | 1/1993 | Jordan | 381/199 |
| 5,184,037 | 2/1993 | Kobayashi et al. | 310/26 |
| 5,682,132 | 10/1997 | Hiroyoshi et al. | 340/407.1 |

FOREIGN PATENT DOCUMENTS

| | | |
|---|---|---|
| 2-17843 | 1/1990 | Japan . |
| 5-85192 | 11/1993 | Japan . |
| 7-106336 | 11/1995 | Japan . |
| 91/03914 | 3/1991 | WIPO . |

Primary Examiner—Nestor Ramirez
Assistant Examiner—Tran N. Nguyen
Attorney, Agent, or Firm—Wenderoth, Lind & Ponack, L.L.P.

[57] ABSTRACT

A vibration actuator for effecting paging is provided in which a vibrating section of an electroacoustic transducer is driven using low frequencies to collide it against a fixed section, and the vibration generated from the collision is transferred as external vibration. The vibrating section of a coil and the fixed section are bonded via an elastic member provided therebetween. The vibration generated at the time of collision can be effectively increased by flexibly supporting a magnetic circuit composed of a magnet, a yoke, etc. and by driving the magnetic circuit with alternating current which has a polarity. To permit easier assembly and to prevent damage or deterioration in characteristics, it is preferable to provide an annular molded member, which has hook-like projections, around the magnetic circuit and to support the magnetic circuit by a rubber member attached to the hook-like projections.

55 Claims, 16 Drawing Sheets

VIBRATION ACTUATOR FOR PAGER

BACKGROUND OF THE INVENTION

1. Field of the Invention

The present invention relates to a vibration actuator for effecting paging which is incorporated in a portable telephone or the like to notify a user of the arrival of a received call not only by sound but also by vibration. More particularly, the present invention relates to the vibration actuator for paging suited for achieving a smaller, lighter design.

2. Description of the Related Art

Conventional vibration actuators for paging are also called vibration motors or vibration-generating actuators. They are required to be compact, thin and inexpensive, and also to be capable of generating vibration at low power consumption. They are intended, however, to generate only vibration. Therefore, they cannot be used for making a voice call or issuing conversational voice. Hence, at least two component units are necessary for obtaining the information on incoming calls and for generating voice signals. Further, the pager vibrating motors which are extensively used consume much starting power for rotating a relatively large mass. They are also disadvantageous in that they have many components because of the rotating design, and provide unsatisfactory reliability or accuracy control. The conventional pager vibrating motors have a further disadvantage, namely, they include current switching brushes because they use direct current, so that they may generate large electromagnetic noises or incur a malfunction at the time of rotation, and they also have a limitation in accomplishing a smaller and flatter design.

FIG. 1 shows a pager vibrating motor which has been most commonly used hitherto. A counterweight 3 is rotated via a shaft 2 driven by a driving motor 1 composed of a cylindrical coreless rotor. The counterweight swings to generate vibration. Naturally, the pager vibrating motor is not capable of generating sound other than the vibration. The driving motor 1 is constituted by a permanent magnet having a curved surface and the cylindrical coreless rotor; and a plurality of magnetic poles to provide rotational driving force. This places restrictions on accuracy control and manufacturing cost in achieving a smaller diameter of the driving motor 1.

FIG. 2 shows the cylindrical pager vibrating motor in a vibrating state. As the driving motor 1 runs, the counterweight 3 swings around a rotational center 4. The vibration is generated in many directions, and therefore, the vibration in a particular direction may not be effectively transferred outside, depending on how the vibration motor for a pager is fixed. Further, a driving force is mandatory because the swinging moment is proportional to the square of the rotational speed of the driving motor 1, thus limiting the efforts in saving power.

FIG. 3 is a perspective view illustrative of the interior of a flat type pager vibrating motor 5 constructed by a conventional flat coreless rotor. A rotary shaft 8 is provided with a disc-shaped winding coil 6 with an eccentric center of gravity to generate a rotational driving force between the winding coil 6 and a sheet-like permanent magnet 7. Driving current is supplied through a brush 9. Unlike the cylindrical motor, the pager vibrating motor 5 makes use of the winding coil 6 with the eccentric center of gravity in place of the counterweight. The winding coil produces vibration when it revolves. Obviously, this pager vibrating motor 5 also cannot be used for generating the voice.

FIG. 4 shows the most effective vibration of the flat type pager vibrating motor 5. The rotations in the axial direction relative to a vibration central axis 10 are indicated by reference numerals 5, 11 and 12 assigned to the main body of the pager vibrating motor 5. There are thickness vibration in the axial direction and diametral vibration at right angles to the axis 10. Frequently, however, the vibrations may hardly contribute to the vibration to be transferred outside, depending on the way the flat type pager vibrating motor 5 is fixed. This means that the driving current applied to the winding coil 6 is not effectively used as the energy for transferring the vibration outside.

Thus, the conventional pager vibrating actuators have not been able to generate sound and voice although they are able to generate vibration. Furthermore, the conventional pager vibrating actuators have not necessarily been able to reduce the required starting power, they have hardly permitted a smaller overall size, and some of them have been prone to rotational malfunction, producing large electromagnetic noises.

SUMMARY OF THE INVENTION

Accordingly, an object of the present invention is to provide a pager vibrating actuator for paging which enables a driving current to be effectively converted to vibration energy and sound. It is another object of the present invention to provide a vibrating actuator for paging which can be manufactured at low cost, which can be easily made smaller and flatter, and which ensures minimized chance of malfunction or electromagnetic noises.

To these ends, in the pager vibrating actuator according to the present invention, a vibrating member based on a moving coil, which vibrates vertically and which has been hitherto used as an electroacoustic transducer, is collided against a portion which is fixed nearby so as to generate the outside vibration.

Further, the collision portion is formed annularly to be approximately as large as the diameter of the moving coil so as to disperse the collision of the vibrating member in the portion having higher structural strength. Furthermore, the annular collision portion is formed into an annular and flat portion so that the impact caused by the collision is distributed evenly to maintain reliability at the time of the collision, thereby controlling the occurrence of collision noise.

The fixed collision portion with which the vibrating member collides is provided with an elastic member to alleviate the shock at the time of the collision and to further control the occurrence of the collision noise.

Another elastic member is provided between the fixed collision portion and the annular collision portion on the top of the coil of the vibrating member which vibrates. The fixed collision portion and the annular collision portion are mutually bonded via the elastic member. In this case, the collision portion, which has been fixed with a sheet-like adhesive layer or adhesive agent exhibiting some elasticity, and the annular collision portion may both be bonded instead of bonding them via the elastic member.

Preferably, a plurality of spiral dampers are formed inside the annular flat portion of the annular collision portion that vibrates, and the other end is fixed to the center of a magnetic circuit to reduce the whole diameter, then the annular flat portion and the dampers are integrally formed using resin.

A dome formed inside the annular collision portion is provided as a part of the vibrating member by bonding it inside the annular collision portion. A magnetic circuit configured by a magnet, a yoke and a plate excluding the coil is supported on a collision cover made integral with the collision portion which is fixed with a vertically flexible component. The component is formed by annularly shaping a thin rubber material. The flat portion around the yoke is supported by the bottom annular end and the top annular end is bonded to the collision cover. Both ends are supported by connecting them with a plurality of thin rubber pieces so as to allow the magnetic circuit to flexibly move up and down.

As an alternative, the component is formed using a tubular rubber piece. A magnetic circuit i.e., a plurality of components forming a magnetic circuit, is held between the flat portion of the rear surface of the yoke apex of an outermost peripheral section of the magnetic circuit and the supporting section fixed to the collision cover by using a tubular rubber piece so as to enable the magnetic circuit to flexibly move up and down.

As another alternative, the component is formed using a bellows-like rubber piece or a foam elastic piece. The magnetic circuit is held among the flat portion of the rear surface and the side surface of the yoke apex of an outermost peripheral section of the magnetic circuit and a supporting section fixed to the collision cover by using a bellows-like rubber piece or foam elastic piece so as to enable the magnetic circuit to flexibly move up and down.

As still another alternative, the component is formed using a thin rubber material, and the bottom of the yoke, constituting a part of the magnetic circuit, is supported by one end of the component, and the other end thereof is bonded to the collision cover, thereby flexibly and vertically supporting the magnetic circuit.

When forming the component using a rubber material, in order to facilitate assembly, an annular resinous molded piece which has a plurality of hook-like projections outside the outer periphery of the yoke of the magnetic circuit is bonded to the collision cover, then a rubber piece for supporting the bottom of the yoke is hooked onto the hook-like projections, thus enabling the magnetic circuit to flexibly move up and down.

As an alternative, the annular resinous molded piece, which has a plurality of hook-like projections outside the outer periphery of the yoke of the magnetic circuit, is bonded to the collision cover, and a ring which has hooks jutting out of a plurality of slits of the yoke is bonded to the bottom of the magnetic circuit. Then a rubber piece is hooked to the hook-like projections and to the foregoing hooks so as to allow the magnetic circuit to flexibly move up and down.

As a further alternative, the magnetic circuit is supported solely by a damper which has a component fixed at the center of the plate so as to allow the magnetic circuit to flexibly move up and down. As necessary, a plate having a circular hole is bonded to the plate on the top of the magnetic circuit. With the circular hole placed at the center, a damper which has been molded using a resinous material is fitted in the hole. In this case, the damper may be provided with a slope so that the central portion thereof may be higher.

The low-frequency driving current for generating the vibration which is applied to the coil should be an alternating current, the dominant polarity of which provides a driving force to the vibrating member in the colliding direction which is opposite from the permanent magnet. The waveform of the driving alternating current provided with a polarity on one side thereof is formed so that the slopes at the rise and fall of the square wave are gentle. To obtain the aforesaid alternating current, an integrating circuit is provided after a square wave producing circuit, then a voltage-to-current converting circuit for current drive is further connected thereto.

DESCRIPTION OF THE PREFERRED EMBODIMENTS

The embodiments of the present invention will be described with reference to the accompanying drawings.

Figure 1:
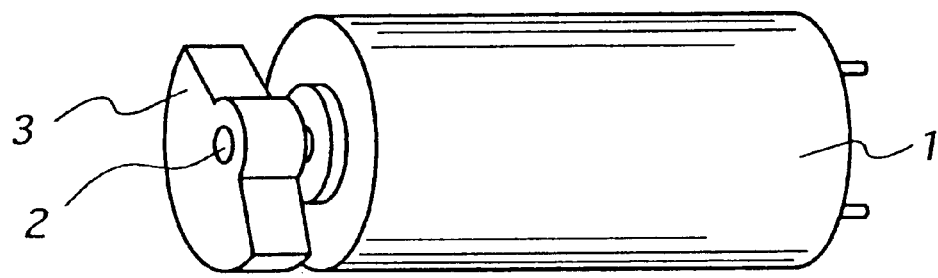
FIG. 1 is a perspective view of a conventional cylindrical vibrating motor for a pager.
Figure 2:
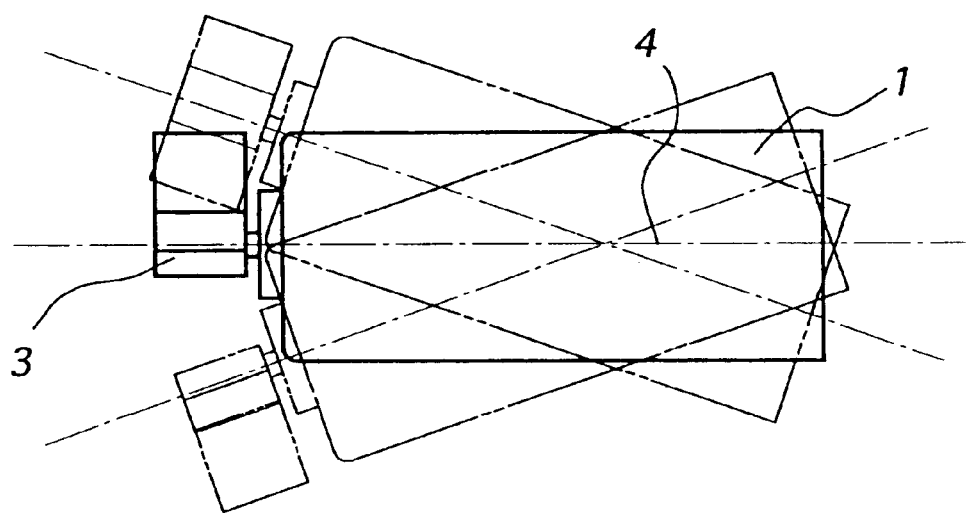
FIG. 2 is an explanatory view of the conventional pager vibrating motor shown in FIG. 1 in a vibrating state.
Figure 3:
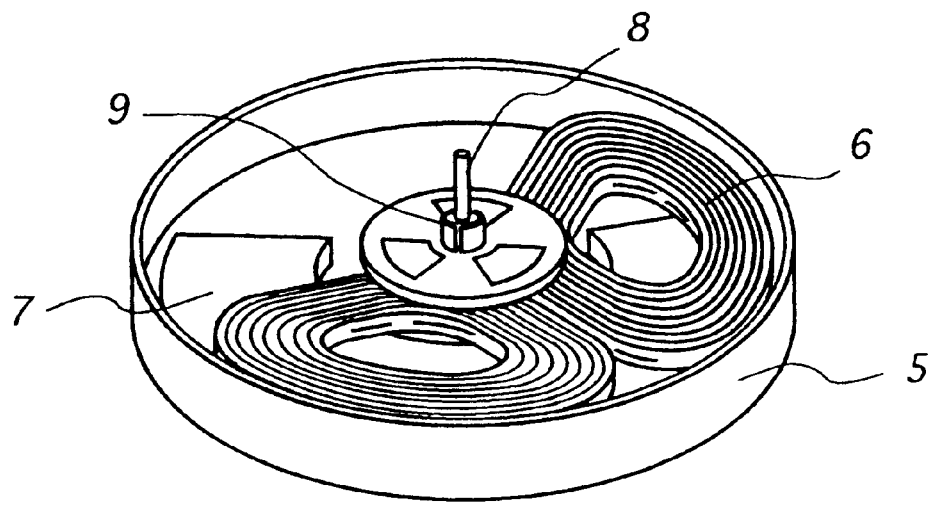
FIG. 3 is a perspective view of the interior of a conventional flat type pager vibrating motor.
Figure 4:
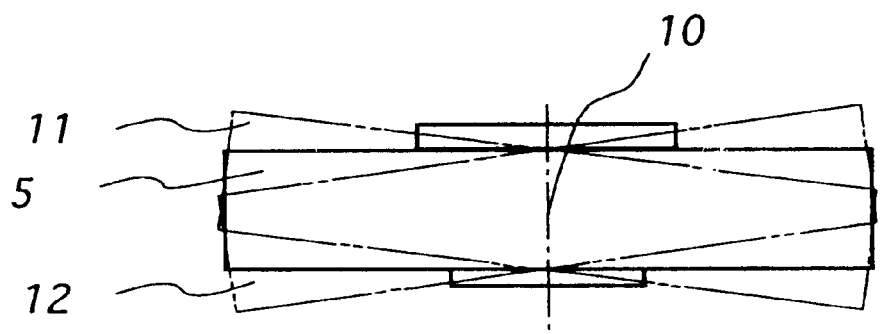
FIG. 4 is a perspective view of the conventional pager vibrating motor shown in FIG. 3 in a vibrating state.
Figure 5:
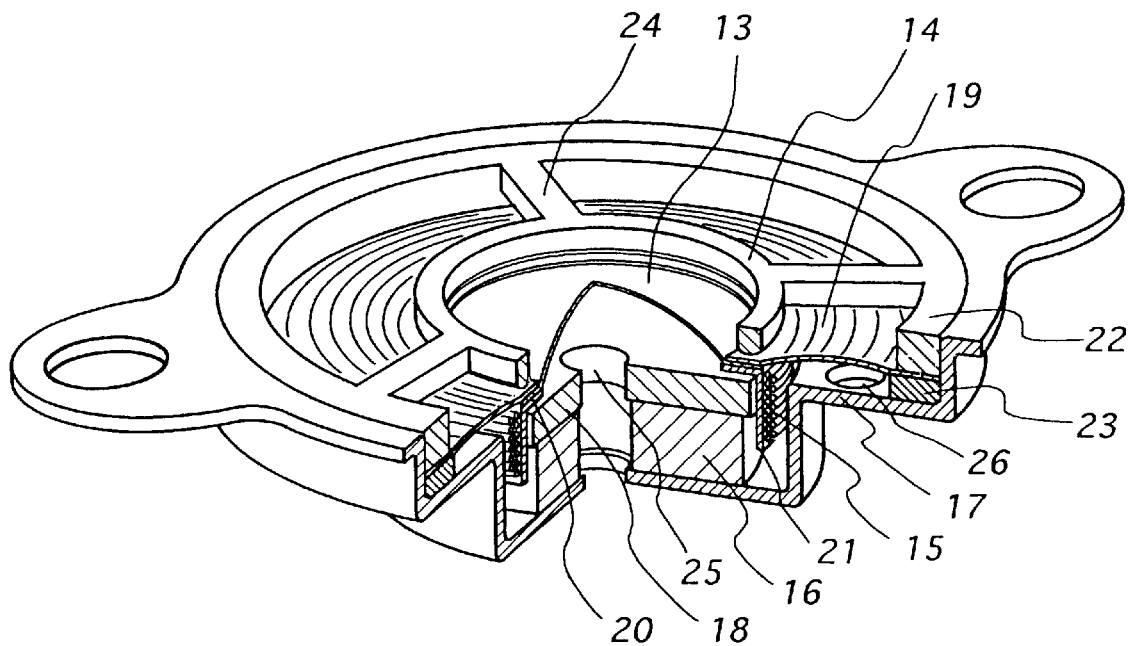
FIG. 5 is a perspective view, partly in section, of a vibration actuator for a pager in accordance with the present invention.

FIG. 5 shows an embodiment of a vibration actuator for effecting paging in accordance with the present invention. It is provided behind an enclosure position 27 in a portable telephone 28 shown in FIG. 7, to which an ear of a user is applied. In FIG. 5, a moving coil type electroacoustic transducer for generating sound and voice is employed. A vibrating member 13 is shaped like a dome to make it resistant to bending when it vibrates and also to enable good voice and sound to be generated. The vibrating member 13 is bonded to a damper 19, which is relatively flexible to be displaced vertically, so as to support the vibrating member 13 in the central and vertical positions thereof. A cylindrical coil 15 composed of a wound thin conductor is formed around a bobbin 21. The bobbin 21 is squarely bent inward at the top to enhance the adhesion between the vibrating member 13 and the damper 19 and to form a ring-shaped flat portion 20 which provides a ring-shaped collision portion.

A magnetic circuit is constituted by a discoid magnetic plate 18 which is bonded to one magnetic pole of a cylindrical permanent magnet 16 which has a hole 25 at the center thereof and which has been magnetized in the direction of the thickness thereof, and a yoke 17 composed of a magnetic plate is bonded to the other magnetic pole. Formed between the yoke 17 and the plate 18 is a ring-shaped gap of a high magnetic flux density through which the coil 15 and the bobbin 21 move up and down.

Figure 6:
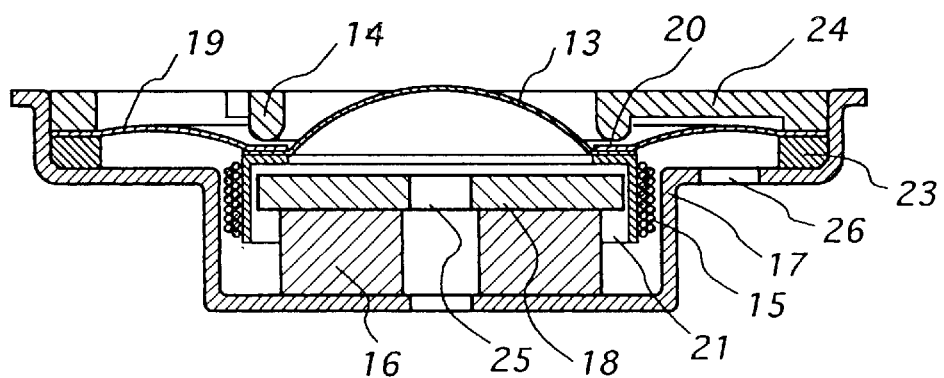
FIG. 6 is a sectional view of the embodiment shown in FIG. 5.

For handling the voice, the vibrating member 13 is supported by the damper 19 in a position so that the displacement of the vibrating member 13 is relatively small and does not cause the vibrating member 13 to bump a collision portion 14 even when a relatively large driving current of a high frequency ranging from a few hundred hertz to 3 kilohertz is supplied to the coil 15. For driving at a low frequency of a few dozen hertz, the displacement of the vibrating member 13 increases, causing it to bump the collision portion 14 which is fixed. The ring-shaped flat portion 20 of the vibrating member 13 is structurally robust and it collides evenly when the vibrating member 13 collides with the collision portion 14. The vibration caused by the collision is transferred through a supporting beam 24 to an outer peripheral section 22 and is further propagated to the outside. The plate 18 is provided with the central hole 25 and the yoke 17 is provided with a plurality of holes 26 to control the back pressure of air when the vibrating member 13 and the damper 19 vibrates at the low frequency. The sectional structure is shown in FIG. 6.

Producing the sound for announcing the arrival of a call signal or generating the conversational voice of an associated party is accomplished by the vibration of the vibrating member 13 at a few hundred hertz to 3 kilohertz. To announce the arrival of the call signal by the vibration, the vibrating member 13 is driven at a few dozen hertz, so that the vibration from the collision with the collision portion 14 is transferred to the outside. At this time, only vertical vibration takes place, allowing the vibration energy to be efficiently taken out to the outside.

Figure 8:
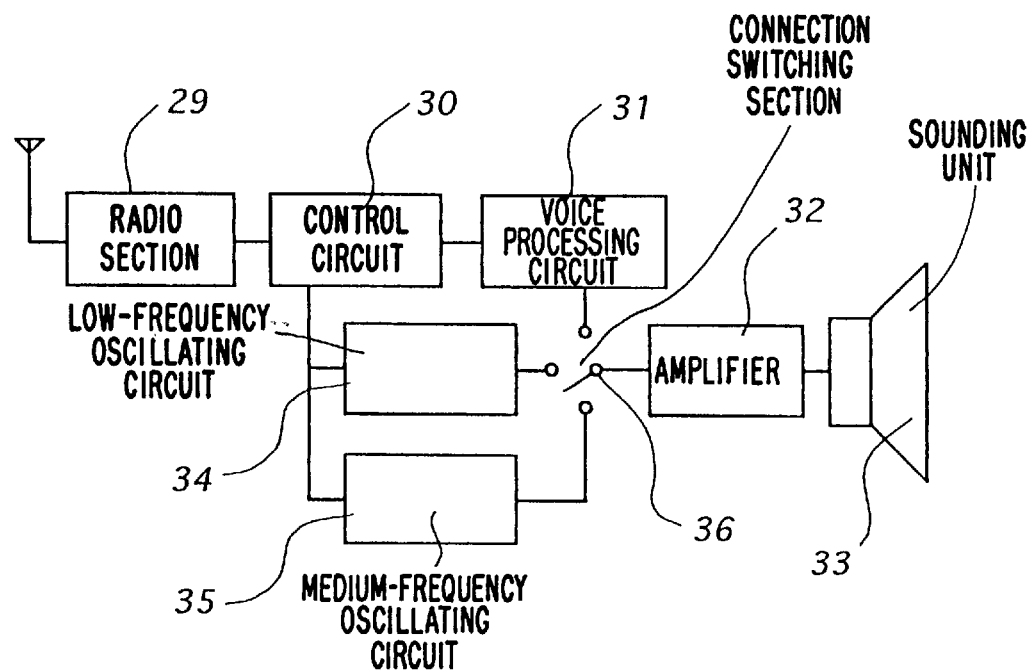
FIG. 8 is a block diagram showing a circuit employed for the present invention.

A primary object of the present invention is to accomplish the functions of the conventional three component units by using a single vibration actuator as a pager, that is, to combine the function of a speaker for generating the sound and voice, the function of a sound generating unit for making audible notification of the arrival of an incoming call and the function of a vibrating motor for generating vibration. As shown by a circuit in FIG. 8, when an incoming signal is received by a radio section 29, a control circuit 30 changes the connection of a connection switching section 36. To generate a call arrival sound of a few kilohertz, a medium-frequency oscillating circuit 35 and an amplifier 32 actuate a sounding unit 33 to generate a sound. To notify a user of the arrival of an incoming call by the vibration, a low-frequency oscillating circuit 34 and the amplifier 32 actuate the sounding unit 33 to generate the vibration. Furthermore, the conversational voice is generated through the sounding unit 33 by a voice processing circuit 31 and the amplifier 32. The vibration actuator for paging in accordance with the present invention will be employed as the sounding unit 33.

Figure 9:
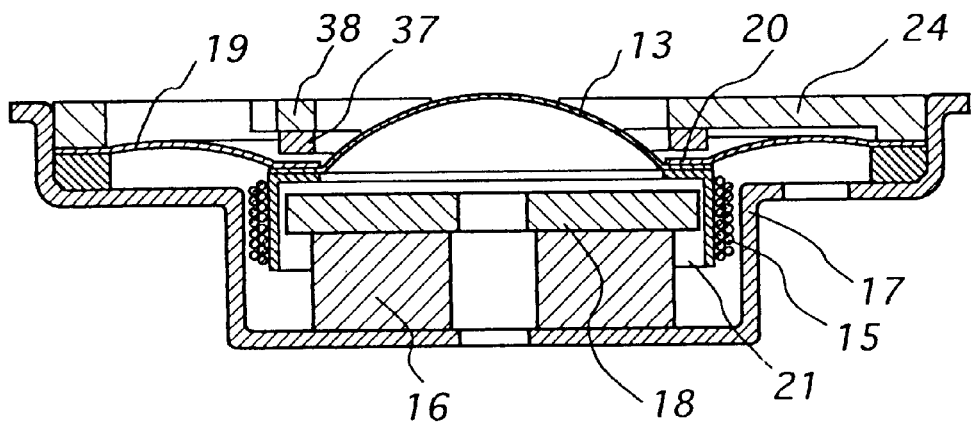
FIG. 9 is a sectional view of another embodiment of the present invention.

Preferably, an elastic member 37 made of rubber or the like is provided on a collision portion 38 as shown by another embodiment in FIG. 9 to control the generation of noises at the time of the collision and to alleviate the impact from the collision so as to minimize the chance of damage.

Figure 10:
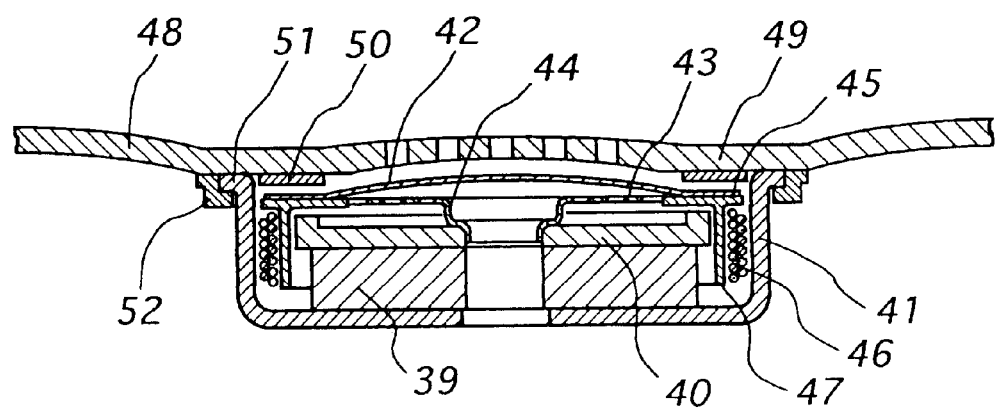
FIG. 10 is a sectional view of still another embodiment of the present invention.

The sectional view of another embodiment of the present invention shown in FIG. 10 shares the same construction for generating the vibration by bumping the top of the coil 46 against a fixed collision portion 49. In FIG. 10, a damper 43 is formed inside a ring-shaped flat section 45 above a bobbin 47 and the coil 46 to achieve a smaller outside diameter, and a damper supporting section 44 is fitted and fixed in the central hole of a plate 40 on a permanent magnet 39. To minimize the thickness, a collision cover 48 should be used as the enclosure of a portable telephone and a part thereof should be used as the fixed collision portion 49. A yoke 41 is supported by a supporting section 52 by applying a yoke apex 51 against the collision cover 48. An elastic member 50 is bonded to the fixed collision section 49 to control collision noises.

Figure 11:
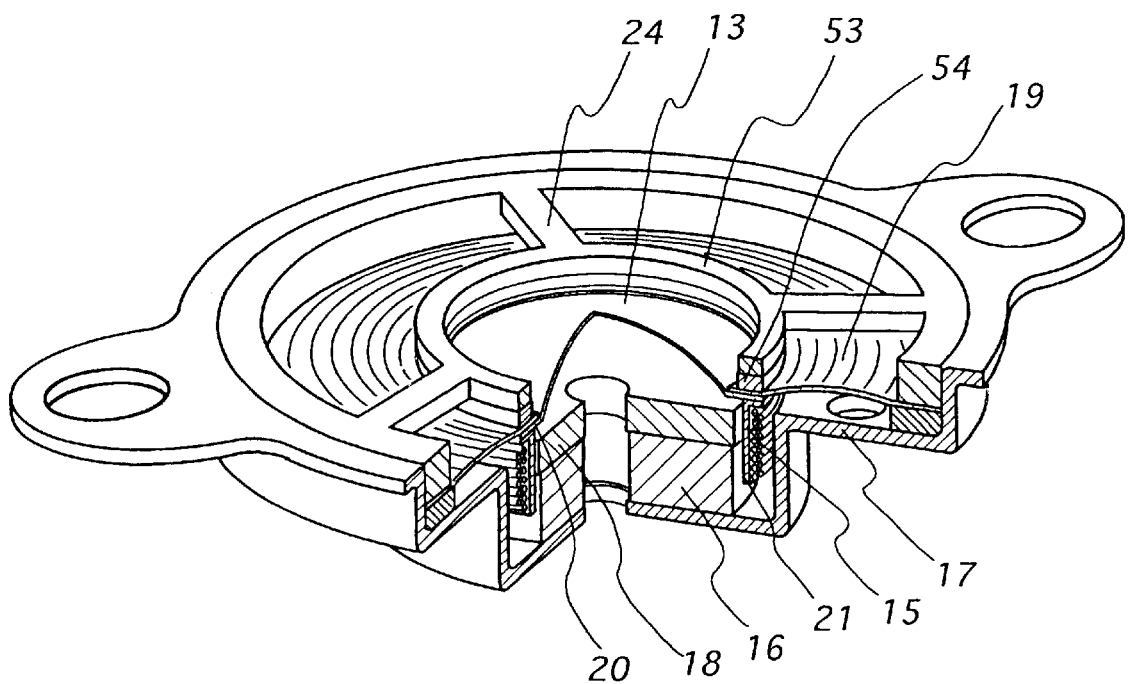
FIG. 11 is a perspective view, partially a sectional view, of still another embodiment of the present invention.
Figure 12:
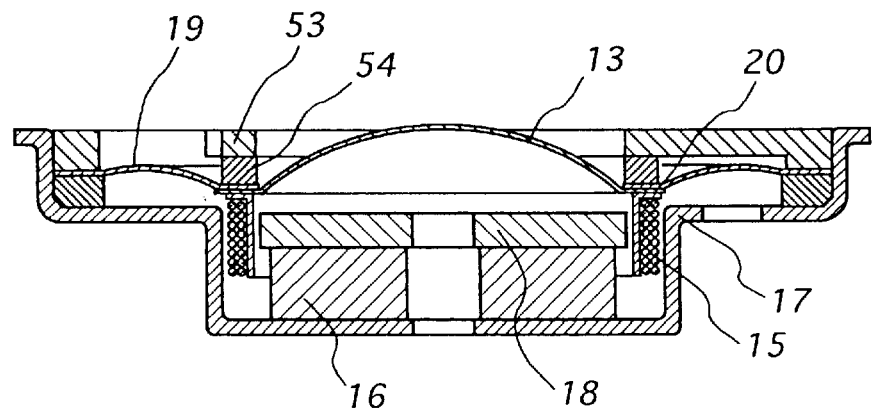
FIG. 12 is a sectional view of the embodiment shown in FIG. 11.

FIG. 11 and the remaining figures will mainly illustrate embodiments wherein the fixed collision portion and the top of the coil are bonded via the elastic member. Even if they are bonded, the transfer of vibration energy is achieved by the collision. As shown in FIG. 11 illustrating an embodiment and FIG. 12 illustrating the portion thereof, a fixed collision portion 53 is bonded to the ring-shaped flat section 20 on the coil 15 with an elastic member 54 provided therebetween. Bonding them will restrain the generation of colliding noises even when no low-density elastic material component such as foam resin component is employed. This enables selection from a wide variety of elastic materials.

In the case of voice, high frequencies ranging from a few hundred hertz to 3 kilohertz are used, the vibrating member 13 exhibits relatively small displacement, requiring only the change in the direction of the thickness of the bonded elastic member 54. When generating vibration at low frequencies of a few dozen hertz, the vibration is produced in the fixed collision portion 53 by making an instantaneous upward displacement by the coil 15. Therefore, the bonding through the elastic member 54 hardly affects the generation of the vibration.

Figure 13:
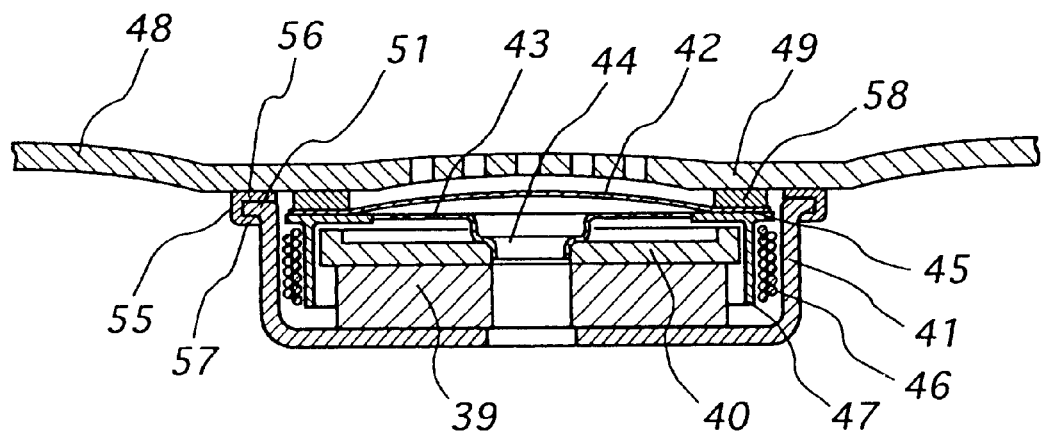
FIG. 13 is a sectional view of yet another embodiment of the present invention.

FIG. 13 shows the section of another embodiment of the present invention which generates increased vibration to be transferred to the outside. The colliding force of the coil 46 is increased by bumping (connecting) a magnetic circuit, which is composed of the permanent magnet 39, the plate 40 and the yoke 41, against the collision cover 48, or by effectively utilizing the repulsion relative to the magnetic circuit owing to electromagnetic force.

For that purpose, it is necessary for the magnetic circuit, which includes the yoke 41, to be flexibly supported so as to allow it to be displaced to a certain extent. In the case of the embodiment shown in FIG. 13, supporting rubber members 55 are used to support the flat section of the yoke apex 51. A thin upper rubber component 56 is used to attach it to the collision cover 48, while a thin lower rubber component 57 is used to cover the bottom of the yoke apex 51. The thin upper and lower rubber components are configured annularly. They are connected using a plurality of supporting rubber members 55 which are not very wide. The supporting rubber members 55 and the upper and lower rubber components are integrally formed.

Figure 14:
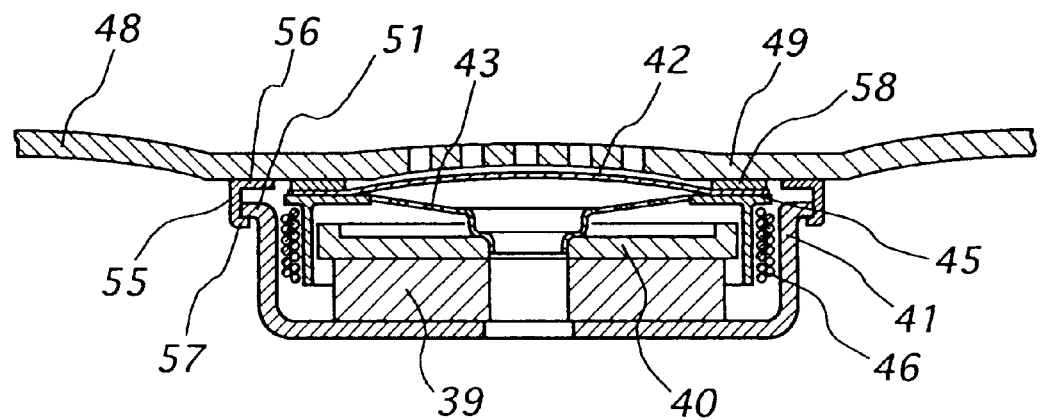
FIG. 14 is a sectional view of the embodiment shown in FIG. 13 at the time of current drive.

FIG. 14 shows a state wherein driving current flows into the coil 46 of the embodiment shown in FIG. 13 and the annular flat section 45 pushes the elastic member 58 to compress it. At the same time, the supporting rubber member 55 which supports the yoke apex 51 elongates and the magnetic circuit moves down, causing the yoke apex 51 to move away from the collision cover 48. This state indicates a case wherein the vibration due to the collision has been transferred to the collision cover 48 or a case wherein the driving current has been polarized.

Figure 15:
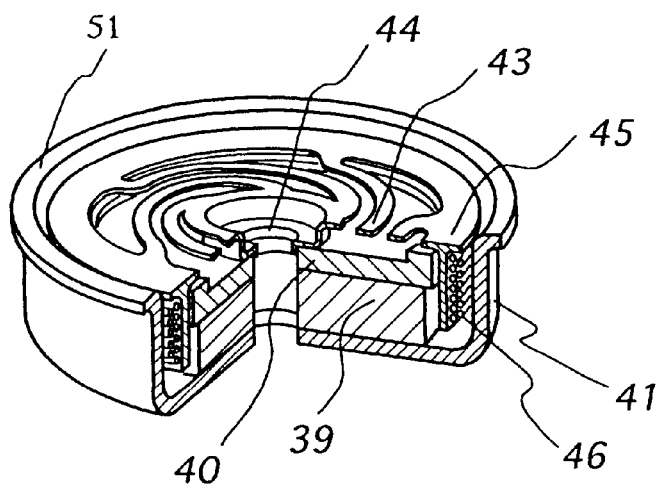
FIG. 15 is a perspective view, partly in section, of a vibration actuator used in the present invention.

The perspective view, partly in section, given in FIG. 15 shows an essential section of the present invention wherein the dome part has been removed from the vibrating member 42 shown in FIG. 13. The damper 43 is formed into a plurality of spirals in order to meet the need for providing firm support toward the center while providing flexibility in the vertical direction at the same time. At this time, it is reasonable to form the ring-shaped flat section 45 at the same time. The damper 43 is fixed at the center of the plate 40 by the damper supporting section 44.

Figure 16:
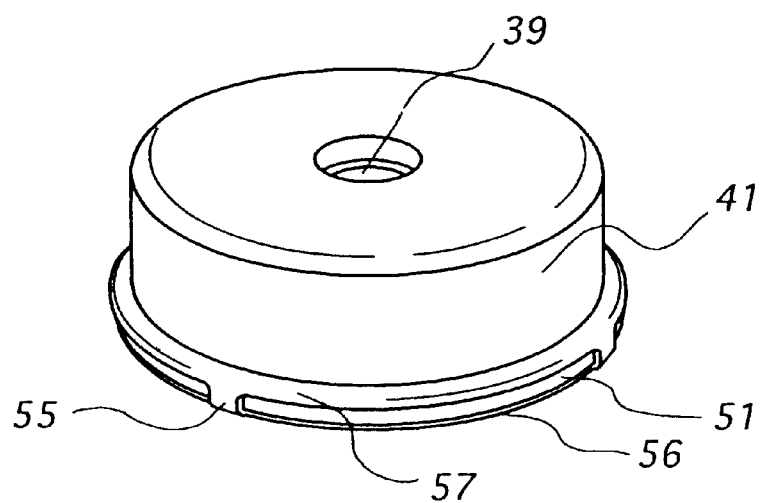
FIG. 16 is a reversed perspective view of the embodiment illustrated in FIG. 13.

FIG. 16 is a perspective view illustrative of the embodiment shown in FIG. 13 which has been turned upside down. The thin annular upper rubber component 56 is bonded to the collision cover 48. When the supporting rubber member 55 is subject to a tension, the portion of the lower supporting rubber member 57 closer to the supporting rubber member 55 is displaced more toward the outer periphery as if the supporting rubber member 55 were expanded greatly.

Figure 17:
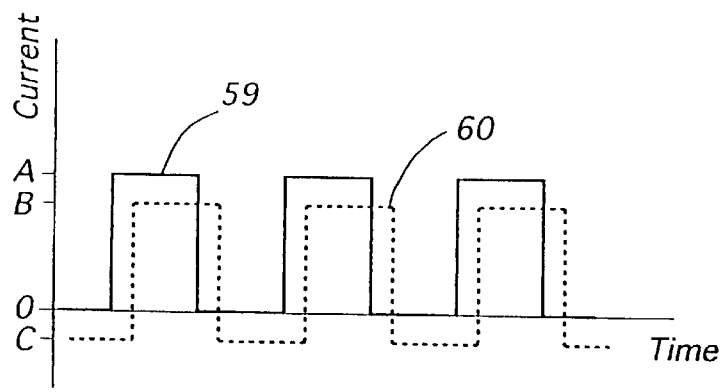
FIG. 17 shows an example of the waveform of a driving current used for the vibration actuator according to the present invention.

FIG. 17 shows an example wherein the driving current is polarized. Polarizing the driving current can be effectively accomplished by employing an alternating current of one polarity so that the coil 46 generates a force which is directed toward the collision cover 48, in the opposite direction from the permanent magnet 39 shown in FIG. 14. The direction of the polarity is decided uniquely by the magnetizing direction of the permanent magnet 39 or the direction of the winding of the coil 46; the polarity which matches the direction of the current is selected. The value of "B" of a square-wave current 60 indicated by a dashed line in FIG. 17 is greater than the value of "C", the polarity of "B" being the dominant polarity. A square-wave current 59 indicated by a solid line has only the polarity between "A" and zero. In the case of the portable telephone which operates on a single power supply, namely, a battery, it is easier to produce a one-polarity current waveform.

If the driving current has no polarity, the state shown in FIG. 14 is generated when the coil 46 receives a current which provides a driving force toward the collision cover 48. This causes the magnetic circuit to be displaced in the opposite direction. If the current direction is reversed, then the yoke 41 collides with the collision cover 48, leading to the need for controlling colliding noises and also to a limited vibration level.

If the driving current has only one polarity as indicated by the square-wave current 59 shown in FIG. 17 and if the current value "A" is relatively large, then the yoke apex 51 is always kept away from the collision cover 48 as illustrated in FIG. 14. For example, when a current of 100 milliamperes is used, if the supporting rubber member 55 is relatively soft, then the magnetic circuit vibrates at a few dozen hertz with an amplitude of approximately plus/minus 0.3 [mm] while floating about 1 [mm] as observed from the collision cover 48 regardless of a vertical movement. This naturally means that the coil 46 is always pressed toward the collision cover 48.

In this case, the vibration from the collision shown in FIG. 14 is transferred through the annular flat section 45 formed integrally with the coil 46 and the elastic member 58 and it causes the fixed collision portion 49 to vibrate. At the time of the rise of the square-wave current 59 shown in FIG. 17, the reaction of the electromagnetic force relative to the magnetic circuit is added to the coil 46, causing a large colliding force to be applied to the fixed collision portion 49 of the collision cover 48, thus generating greater vibration. Further, when the current has one polarity and has a greater current value, the driving force of the coil 46 and the colliding force based on the reaction relative to the magnetic circuit are greater.

As indicated by the square-wave current 59 of one polarity shown in FIG. 17, when driving current with a steep rise is applied to the coil 46 of the embodiment shown in FIG. 13, the vibrating member 42 develops a temporary large mechanical deformation stress, and a significantly high level of noise which includes many high-frequency components is produced. In the case of a trapezoid wave, the gentler the slope, the smaller the unwanted noise becomes. The noise level becomes further lower in the case of sine waves or triangle waves. If, however, the slope is too gentle, weaker vibration will result. Almost the same result has been obtained when the majority of the dome section of the vibrating member 42 was removed.

Figure 18:
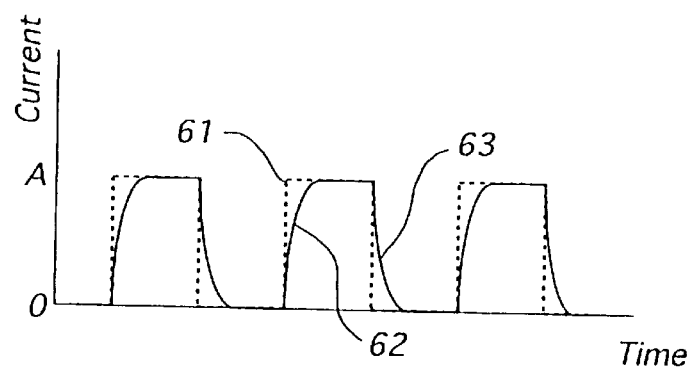
FIG. 18 shows an example of the waveform of another driving current used for the present invention.
Figure 19:
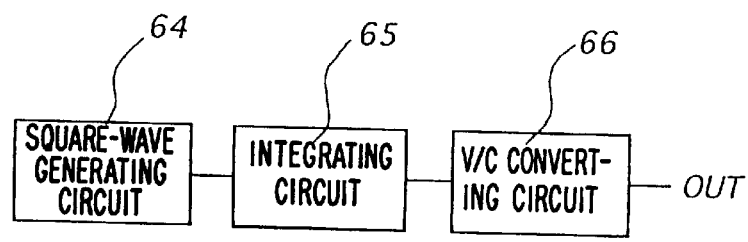
FIG. 19 is a block diagram illustrative of a circuit for generating the driving current shown in FIG. 18.

Applying a square wave 61 indicated by a dashed line shown in FIG. 18 to an integrating circuit makes it possible to achieve a gentler slope of the waveform. In the case of a rising curve 62, the unwanted noise containing high-frequency components can be controlled to a nearly harmless level simply by setting the time required for reaching saturation level A so as to provide a curve slope of about one sixth of a cycle. A falling curve 63 is reversely similar to the rising curve 62. Incidentally, when the frequency is 80 hertz, the unwanted noise could be ignored in practical use at a time constant of about 1.5 milliseconds. As illustrated by the block diagram in FIG. 19, the circuit can be constituted by an integrating circuit 65 and a voltage-to-current converting circuit 66 which are connected following a square-wave generating circuit 64.

When the ring-shaped flat section 45 formed integrally with the coil 46 is bonded to the fixed collision portion 49 via the elastic member 58 as in the case of the embodiment shown in FIG. 13, the unwanted noise produced at the time of the collision will be smaller than that of the case where the ring-shaped flat section 45 may move apart from the elastic member 58 bonded to the fixed collision portion 49. The generated vibration will not be weakened. The voice level drops somewhat in the low sound area in the vicinity of a few hundred hertz. However, such a drop can be compensated by making the collision cover 48 relatively thin. The volume of high-frequency sound will be high because a part of the collision cover 48 made of a resinous material also vibrates at the same time when the vibrating member 42 vibrates.

Figure 7:
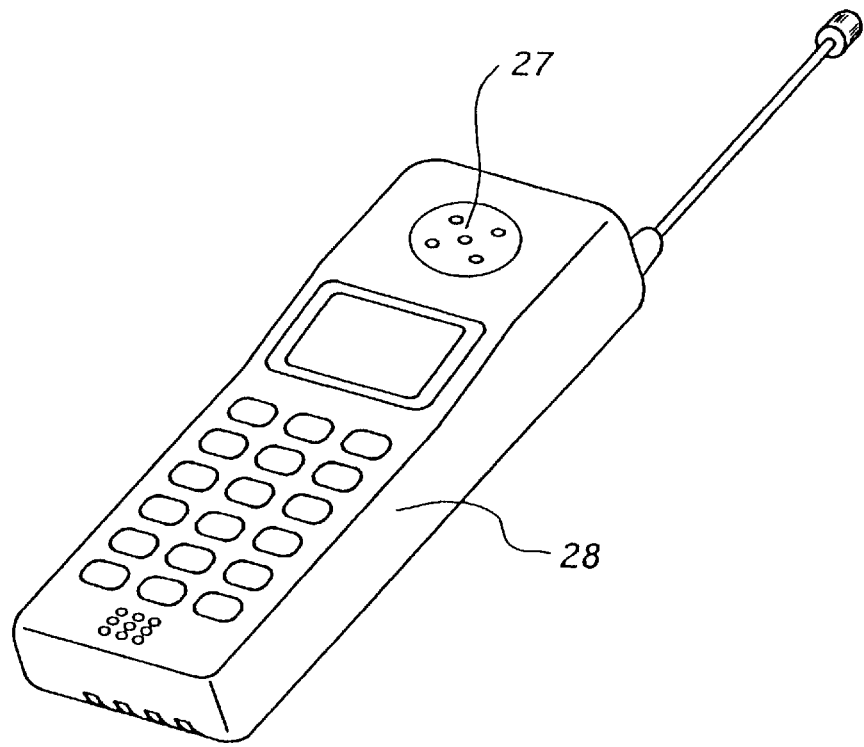
FIG. 7 is a perspective view of a portable telephone which incorporates the vibration actuator in accordance with the present invention.

When the vibration actuator for paging in accordance with the present invention is installed in the enclosure position 27 of the portable telephone 28 as shown in FIG. 7, it naturally vibrates greatly in the enclosure position 27. However, it also vibrates in another enclosure position. Hence, the portion where the sound is generated is not limited to a particular position of the enclosure. Instead, the sound is generated over a relatively wide surface area of the enclosure, making it easy to listen to the voice of an incoming call even if the enclosure position 27 is covered tightly with clothing or the like.

Other embodiments of the present invention for fulfilling the same object as that described in conjunction with FIG. 13 will be shown by the sectional views given in FIG. 20 through FIG. 34. These embodiments obviously share the same concept in that the magnetic circuit is supported flexibly to maximize the vibration and large vibration is generated by the fixed collision portion 49. The fixed collision portion of the collision cover 48 and the ring-shaped flat section on the top of the coil may be bonded via an elastic member.

Figure 20:
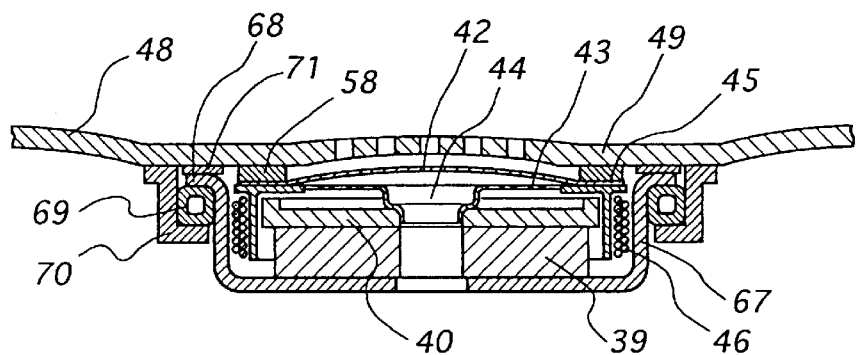
FIG. 20 is a sectional view of another embodiment of the present invention.

In the embodiment shown in FIG. 20, the magnetic circuit is supported by a supporting section 70 via a tubular rubber component 69 at the flat section on the rear surface of the yoke apex 71 in the outermost peripheral section of the magnetic circuit. The supporting section 70 is fixed to the collision cover 48, so that the magnetic circuit, which includes a yoke 67, can be displaced up and down relatively flexibly. The supporting section 70 should be formed annularly and bonded to the collision cover 48.

Figure 21:
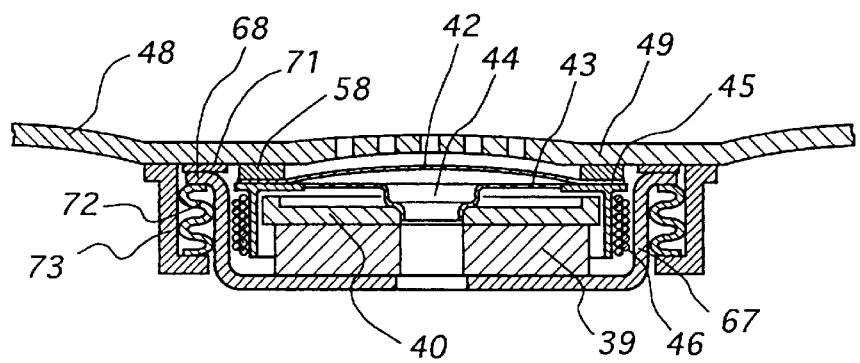
FIG. 21 is a sectional view of a further embodiment of the present invention.

In another embodiment shown in FIG. 21, the magnetic circuit is pushed by a bellows-like rubber component 72 on the flat section of the rear surface of the yoke apex 68 and supported by the outer peripheral section of the yoke 67 and the supporting section 73. This allows the magnetic circuit, which includes the yoke 67, to be displaced up and down flexibly.

Figure 22:
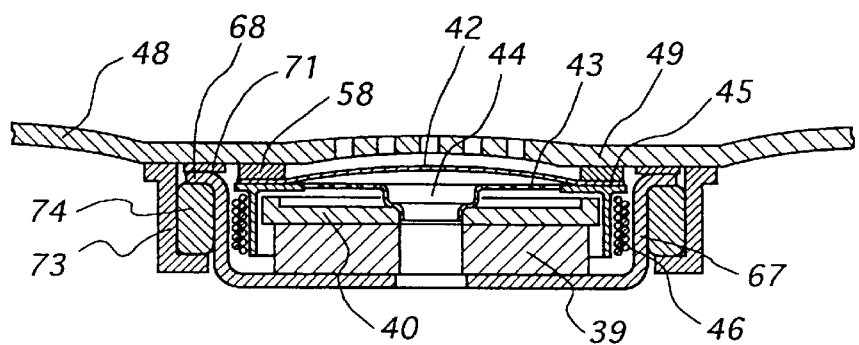
FIG. 22 is a sectional view of a still further embodiment of the present invention.

In still another embodiment shown in FIG. 22, a tubular foam elastic member 74 is applied to the flat section of the rear surface of the yoke apex 68, and the magnetic circuit, which includes the yoke 67, is supported by the supporting section 73.

Figure 23:
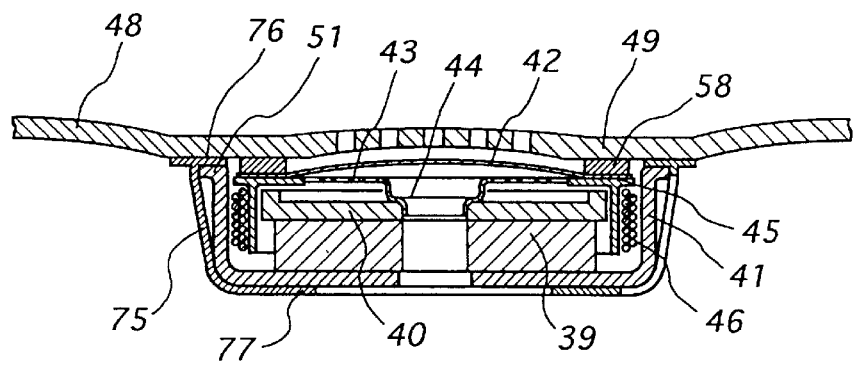
FIG. 23 is a sectional view of yet another embodiment of the present invention.

FIG. 23 shows yet another embodiment, and in this embodiment the bottom of the yoke 41 of the magnetic circuit is flexibly supported by a supporting rubber member 75 and a rubber component bottom 77 continuing from a rubber component 76 bonded to the collision cover 48. The ring-shaped flat section 45 is bonded to the fixed collision portion 49 of the collision cover 48 via an elastic member 58.

Figure 24:
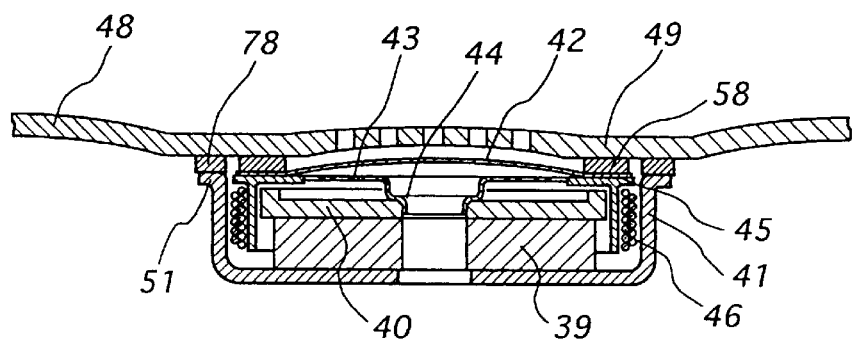
FIG. 24 is a sectional view of a further embodiment of the present invention.

FIG. 24 shows an embodiment wherein the yoke apex 51 and the collision cover 48 are bonded via a soft elastic member 78 so as to support the yoke 41 with a certain level of flexibility. The ring-shaped flat section 45 and the fixed collision portion 49 are bonded via the elastic member 58.

Figure 25:
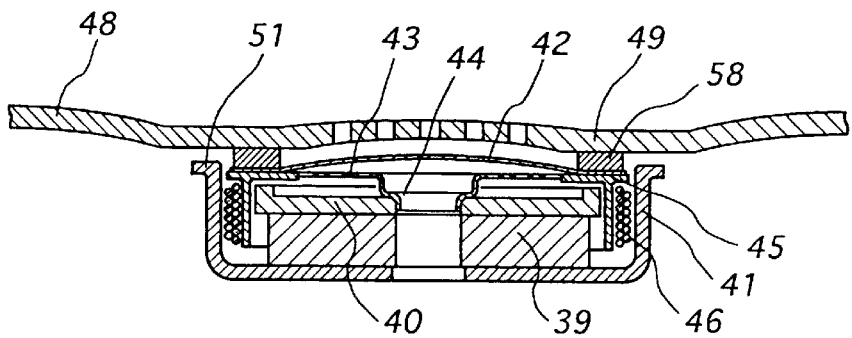
FIG. 25 is a sectional view of another embodiment of the present invention.

FIG. 25 shows an embodiment wherein the magnetic circuit is flexibly supported solely by the damper 43 which is fixed to the central part of the plate 40 by the damper supporting section 44. The collision cover 48 and the ring-shaped flat section 45 are bonded via the elastic member 58 to support the whole unit including the magnetic circuit.

Figure 26:
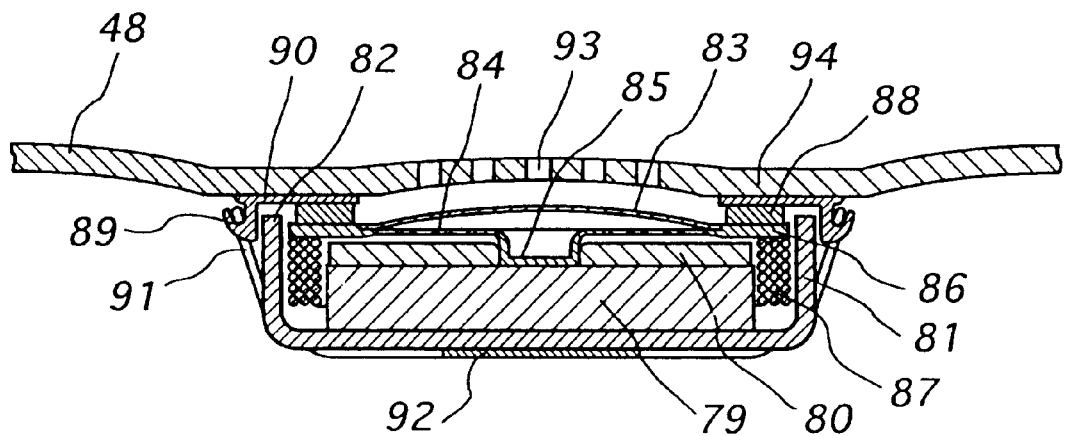
FIG. 26 is a sectional view of yet another embodiment of the present invention.

Further embodiments of the present invention which share the same object and which are designed with an emphasis placed on easier assembly and more stable structure will be shown by the sectional views shown in FIG. 26 through FIG. 29. In FIG. 26, an annular resinous molded member 90 which has a plurality of hook-shaped projections 89 is bonded integrally to the collision cover 48. With the area near the inner diameter of the annular resinous molded member 90 used as a fixed collision portion 94. An annular flat section 86 of a vibrating member 83 is bonded via an elastic member 88 therebetween. A supporting rubber member 91 is mounted on the plurality of hook-shaped projections 89 and the bottom of a yoke 81 is supported by a rubber bottom 92 to support the magnetic circuit constituted by the yoke 81, a plate 80, and a permanent magnet 79 such that it is allowed to flexibly move up and down. The supporting rubber member 91 need not be fixed with an adhesive, permitting easier assembly and stabler structure.

Figure 27:
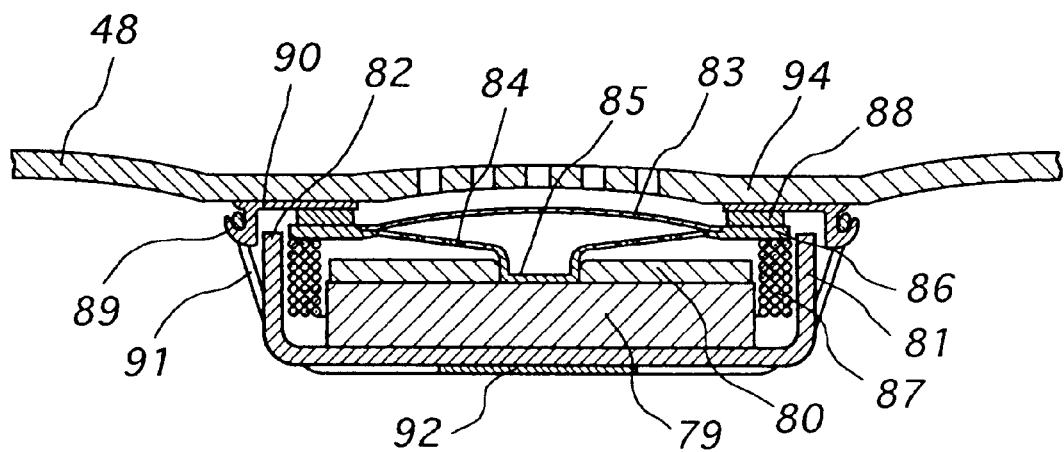
FIG. 27 is a sectional view of the embodiment shown in FIG. 26 at the time of current drive.

FIG. 27 shows a state wherein a current having a polarity flows through a coil 87. As previously described, a yoke apex 82 vibrates while it is in a floating state and the reaction of the electromagnetic force is added to the coil 87, and large vibration is transferred to a fixed collision portion 94 of the collision cover 48 from the annular flat section 86 via the elastic member 88.

Figure 28:
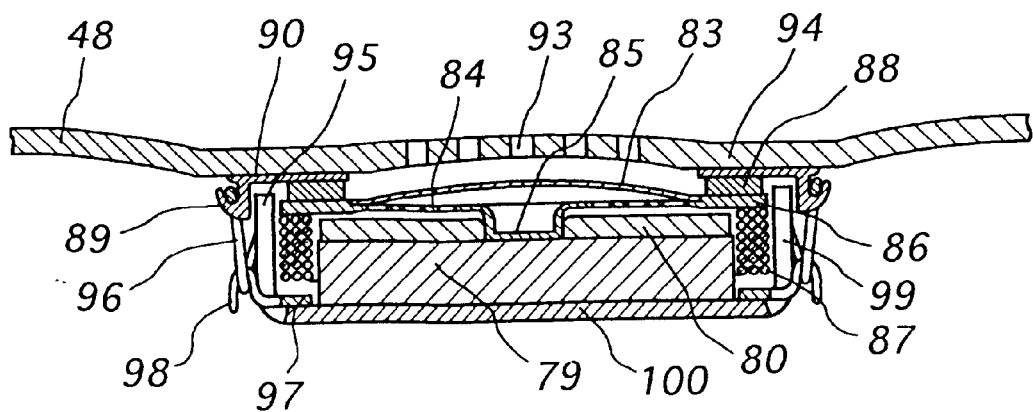
FIG. 28 is a sectional view of a further embodiment of the present invention.

In FIG. 28, a supporting rubber member 96 is mounted alternately on a plurality of hooks 98 to support the magnetic circuit such that it flexibly moves up and down. The hooks 98 are made integral with a ring 97. The ring 97 is fixed to a bottom area between a permanent magnet 79 and a yoke 100, and the hooks 98 jut out of slits 99.

In both embodiments shown in FIG. 26 and FIG. 28, a damper 84 which flexibly moves up and down is used to center the magnetic circuit relative to the coil 87 by fixing a damper supporting section 85 at the central part of the plate 80. Supporting with the supporting rubber member 96 mounted on the hooks 98 obviates the need for the rubber member on the bottom of the yoke 100, contributing to making the whole unit thinner.

Figure 29:
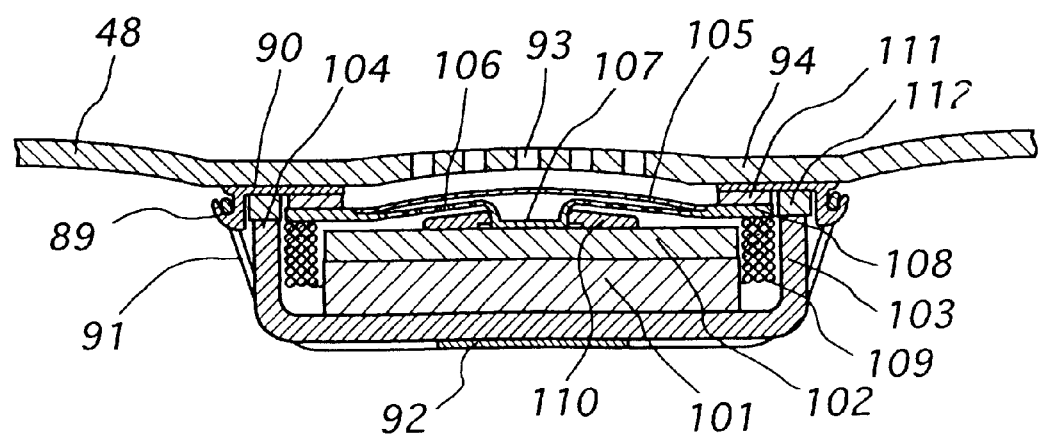
FIG. 29 is a sectional view of a still further embodiment of the present invention.

The embodiment shown in FIG. 29 has almost the same structure as that of the embodiment shown in FIG. 26. It effectively utilizes a permanent magnet 101 to make the whole unit as thin as possible. The embodiment is also designed to flexibly support the magnetic circuit by the supporting rubber member 91 which is attached to the hook-shaped projections 89 and the bottom of a yoke 103. However, a plate 102 on the permanent magnet 101 does not have a hole at the center thereof, thus permitting more effective use of the permanent magnet 101. Further, a damper 106 is provided with a slope to make the center thereof higher. A damper supporting section 107 is fitted in a hole at the center of a plate 110 (i.e., a centering device) bonded to a plate 102 and it is bonded to be fixed, thereby achieving centering and making the whole unit thinner at the same time. An elastic member 111 may be provided to restrain a collision noise if a yoke apex 104 should collide against the annular resinous molded member 90.

If the vibration actuator for paging in accordance with the present invention incorporated in a portable telephone or the like, is subject to a sudden change in acceleration, a sudden positional change may take place in the collision cover 48, serving also as the enclosure, and in the magnetic circuit which has a relatively large mass, and a resulting high stress applied to the damper may damage the unit. To avoid such a possibility of damage, the supporting rubber members 91 and 96 serve to protect the damper from a great change in acceleration in a direction perpendicular to the collision cover 48, while the hook-shaped projections 89 serve to protect it from a great change in acceleration in a parallel direction.

Figure 30:
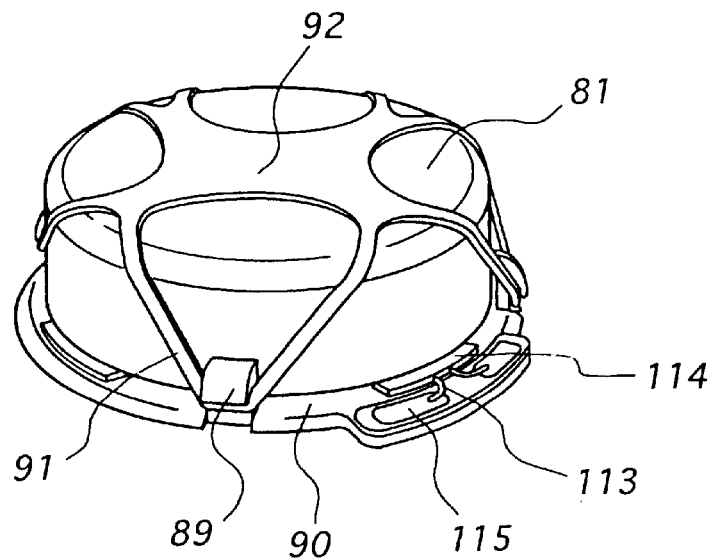
FIG. 30 is a reversed perspective view of the embodiment shown in FIG. 26.

FIG. 30 is a perspective view showing the embodiment of FIG. 26 turned upside down. The bottom of the yoke 81 which is a part of the magnetic circuit is supported by the rubber bottom 92 continuing from the supporting rubber member 91. The supporting rubber member 91 is attached to the hook-like projections 89 provided on the annular resinous molded member 90 so as to flexibly support the whole magnetic circuit. An electrode wire 113 from the coil is conveniently fixed using an elastic member 114 and connected to a terminal 115 at the time of assembly.

Figure 31:
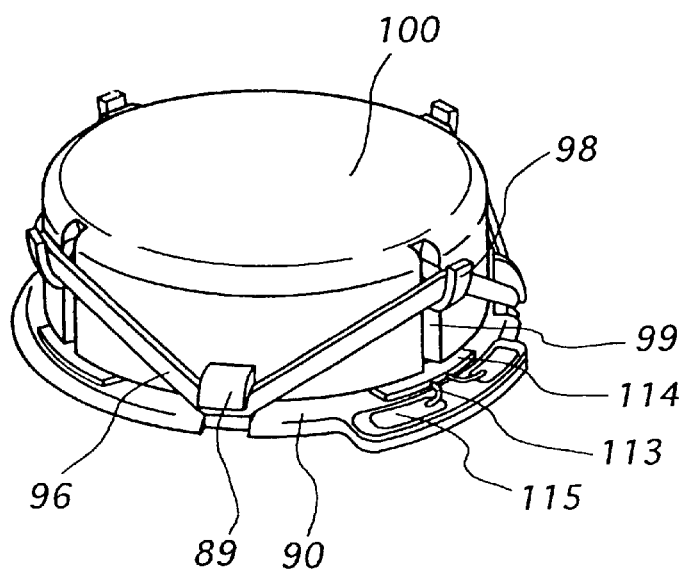
FIG. 31 is a reversed perspective view of the embodiment shown in FIG. 28.

FIG. 31 is a perspective view showing the embodiment shown in FIG. 28 turned upside down. The hooks 98 are projected from the slits 99 of the yoke 100 constituting a part of the magnetic circuit, and the supporting rubber member 96 is alternately mounted to the hook-like projections 89 to flexibly support the whole magnetic circuit. When driving the unit by a current having polarities, the terminal 115 needs to be provided with color-coding or marked so as to prevent reverse polarity setting.

Figure 32:
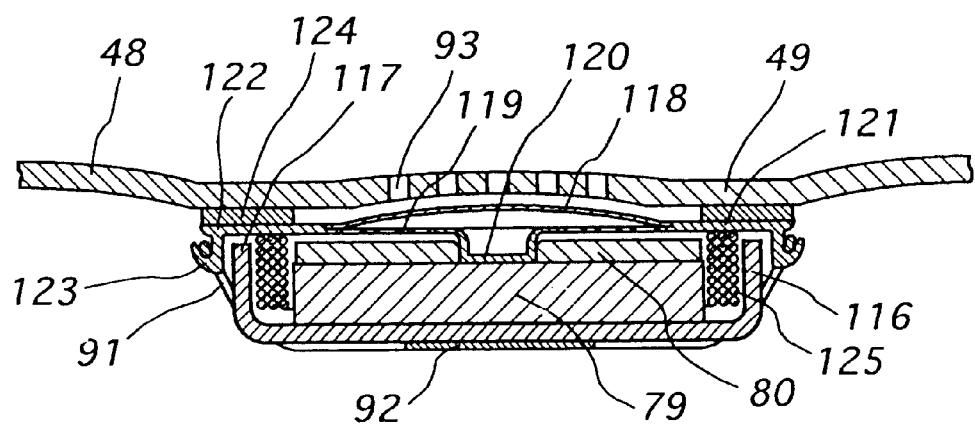
FIG. 32 is a sectional view of a further embodiment of the present invention.
Figure 33:
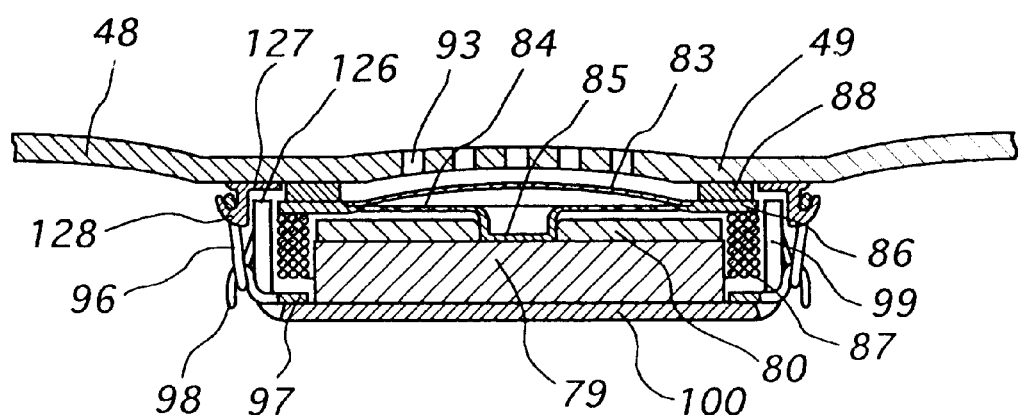
FIG. 33 is a sectional view of a still further embodiment of the present invention.

Other embodiments in accordance with the present invention shown in FIG. 32 and FIG. 33 illustrate the constructions which differ in the shape of the annular resinous molded member having the hook-like projections and the bonding method. In the embodiment shown in FIG. 32, an annular resinous molded member 122 provided with hook-like projections 123 and an annular flat section 121 are continuously formed into one piece. Further, the integrally formed member and the fixed collision portion 49 are bonded via an elastic member 124. In both embodiments, the magnetic circuit is attached to the hook-like projections 123 and supported by the tension provided by the supporting rubber member 91 applied to the bottom of a yoke 116. The vibration at low frequencies and the mechanism for generating relatively high-frequency voice are basically the same as those of other embodiments designed to flexibly support the magnetic circuit which have already been described.

In the embodiment shown in FIG. 33, the inside diameter of an annular resinous molded member 127 provided with hook-like projections 128 is made larger than the outside diameter of the elastic member 88. The annular flat section 86 and the fixed collision portion 49 are bonded with the elastic member 88 provided therebetween. This embodiment also shares the same mechanism for generating the vibration and the voice. The supporting rubber member 96 is attached to the hooks 98 to support the magnetic circuit in this embodiment; supporting the bottom of the yoke 100 by a rubber member instead would present no functional problem.

Figure 34:
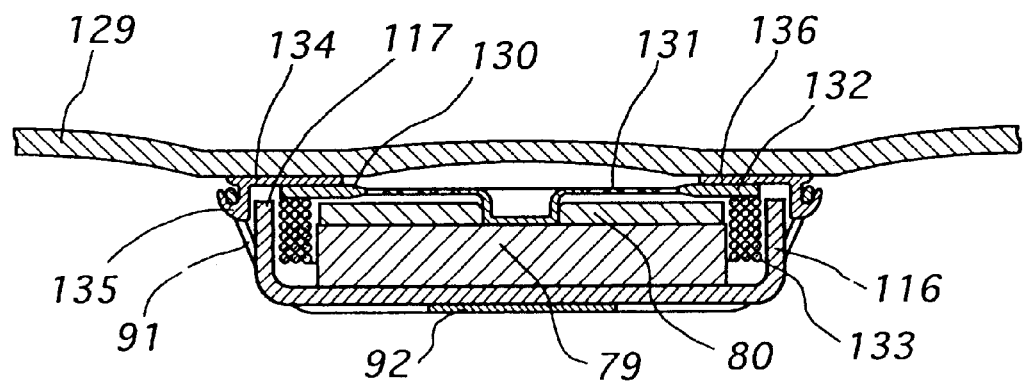
FIG. 34 is a sectional view of another embodiment of the present invention.

In another embodiment of the present invention shown in FIG. 34, the inner diameter section of an annular resinous molded member 134 firmly bonded to a collision cover 129 provides a fixed collision portion 136. An annular flat section 132 is directly bonded using an adhesive sheet or an adhesive layer which has a certain degree of elasticity. The supporting rubber member 91 is attached to hook-like projections 135 to flexibly support the magnetic circuit. If the adhesive sheet or the adhesive layer is considerably thick and soft, then nearly the same effect as that obtained in other embodiments wherein the components are bonded via the elastic member will be accomplished. Conversely, if the adhesive sheet or the adhesive layer is thin and not very soft, then sound of a low frequency of 1 kilohertz or less, in particular, will deteriorate. As corrective measures for this, the collision cover 129 is made slightly thinner or a part of the collision cover 129 is made thinner annularly to make it easier for the collision cover to vibrate when a coil 133 vibrates. This embodiment obviates the need for providing the collision cover 129 with the hole for letting sound waves to pass through as in the case of the embodiment shown in FIG. 23. Further, the dome section of the vibrating member may be removed. This structure enables easier waterproof or dust-proof design to be accomplished.

Figure 35:
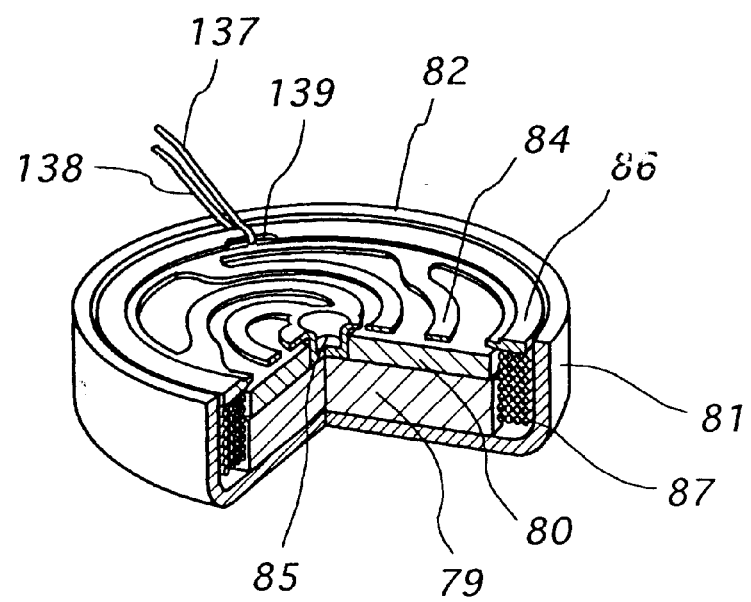
FIG. 35 is a perspective view, partly in section, of a vibration actuator for pager used in the present invention.

The method for leading out the electrode wire from the coil 87 is illustrated in FIG. 35 which is a perspective view, partly in section, of the essential part of an embodiment in accordance with the present invention. The coil is wound by an even number of turns, and an electrode wire 137 on one end is pulled out from the outer side of the damper 84 through a recess 139 on the inner side of the annular flat section 86. An electrode wire 138 on the other end is pulled out from the outer side of the annular flat section 86. To fix the electrode wires 137 and 138 such that they are not affected by the vibration of the magnetic circuit, the electrode wires should preferably be bonded to the aforesaid annular resinous molded member.

The coil 87 shown in FIG. 35 does not have the bobbin 21 or the bobbin 47 shown in FIGS. 5, 10 and 13. The bobbin is used as the core for winding the coil to add to the structural strength. However, the vibration actuator for pager according to the present invention has many turns of the coil 87, e.g. six layers, and the coil is as wide as approximately 0.7 [mm]; this alone is sufficient for providing durability. The presence of the bobbin would require that the gap of the magnetic circuit be increased for the thickness of the bobbin, resulting in a lower intensity of the magnetic field. For these reasons, it is preferable to use the coil without the bobbin and to bond the coil in the vibrating actuator for pager in accordance with the present invention.

Driving the coil 87 by applying alternating current from outside to the electrode wire 137 or 138 no longer requires the changing of the contact setting as in the case of the conventional DC-driven pager vibrating motor. Switching the contact setting frequently causes a large electromagnetic noise to occur, whereas no such noise problem will take place in the vibrating actuator for pager according to the present invention.

Since the present invention is configured as described above, it will provide the advantages set forth below.

The vibration actuator for paging in accordance with the present invention employs a moving coil type electroacoustic transducer wherein a coil having a vibrating member moves to generate high-quality voice and sound and also to generate vibration to be transferred to the outside at low frequencies. Thus, the functions of all the pager vibrating motor for notifying a user of the arrival of an incoming call, the voice generating unit, and the speaker for received speech in a conventional portable telephone can be fulfilled in just one unit.

Furthermore, the vibrating member moves only in the vertical direction to collide against the enclosure of a portable telephone or the like, thus allowing the vibration energy to be effectively taken out. The required actuating power is relatively small, contributing to the saving of power. The annular flat section which serves as the annular collision section made integral with the coil collides with a collision cover of an enclosure or the like via an elastic member to generate large vibration from the collision. The elastic member is also capable of controlling unwanted collision noise at the time of the collision.

Moreover, the magnetic circuit is flexibly supported using a rubber member or the like so that the magnetic circuit including a yoke may move up and down relatively easily. This makes it possible to add the reaction from the moving magnetic circuit to the driving force of the coil itself, enabling larger vibration to be generated at the time of the collision.

The driving current, which has a polarity, causes the coil to apply a force to the collision section at all times. Therefore, the elastic member is not subject to a peeling force, so that the elastic member does not come off. The driving current which has a polarity causes the magnetic circuit composed of a yoke, etc. to move in a floating state, adding an even larger repulsive force to the coil so as to generate even larger vibration. As a result, greater vibration than that available with the conventional pager vibrating motor can be produced.

The vibration sound does not include the vibration of relatively high frequencies from sliding as in a conventional unit. A low, single frequency is used for the driving current which can be selected freely. Therefore, a frequency that produces easy-to-feel vibration can be selected. However, the frequencies in the vicinity of a resonance frequency should be avoided to maintain high reliability.

The use of alternating current as the driving current naturally eliminates the need for changing the contact setting as in the conventional DC-driven pager vibrating motor. Therefore, no electromagnetic noise is produced. Thus, it is no longer necessary to provide a portable telephone with a noise filter, and there will be no chance of causing other external equipment to incur malfunction.

Furthermore, the damper is disposed inside the coil diameter according to the present invention. Therefore the whole outer diameter can be reduced despite the larger diameter of the driving coil, and yet, a larger driving force can be produced. The vibration actuator for paging according to the invention combines the vibration generating function and the voice and sound generating function so as to make the unit smaller than the volume occupied by three component units including the conventional vibration actuator.

The use of the annular resinous molded member provided with hook-like projections permits easier mounting. For example, the actuator can be installed to a portable telephone or the like simply by providing the top surface of the resinous molded member with an adhesive layer which has a peelable sheet.

Since the electrode wires from the coil can be bonded and fixed to the annular resinous molded member, the mounting work can be simplified. In addition, the electrode wires are nearly fixed so that they do not come in contact with the yoke that vibrates greatly, thus minimizing the chance of electrical short-circuit attributable to a disconnected electrode wire or peeled covering. The plurality of hook-like projections and the rubber member supporting the magnetic circuit enable protection of the vibration actuator for paging from damage even if the portable telephone is accidentally dropped and subject to high acceleration.

In addition, unlike the conventional vibration actuator for paging, the vibration actuator according to the invention has no rotary components and therefore no brush or bearing, thus requiring fewer components. The vibration actuator is free of the problem of failure to start caused by an improper position of an electric contact.

What is claimed is:

1. A vibration actuator for use in effecting paging, said vibration actuator comprising:

a fixed collision portion;

an electro-acoustic transducer including: a magnetic circuit having a permanent magnet and a coil; and a vibrating member movably mounted with respect to said permanent magnet for movement up and down relative to said permanent magnet;

wherein said vibrating member includes a vibrating collision portion which is integrally movable with said vibrating member and which is operable to collide against said fixed collision portion during the up and down movement of said vibrating member, to thereby generate a vibration.

2. A vibration actuator as claimed in claim 1, wherein said fixed collision portion is provided with an elastic member and said vibrating collision portion of said vibrating member is operable to collide against said elastic member of said fixed collision portion.

3. A vibration actuator as claimed in claim 1, wherein a top portion of said coil and said fixed collision portion are bonded together, with an elastic member being interposed between said top portion of said coil and said fixed collision portion.

4. A vibration actuator as claimed in claim 3, further comprising an adhesive layer which has elasticity and which is provided between said top portion of said coil and said fixed collision portion.

5. A vibration actuator as claimed in claim 1, wherein said coil and said vibrating member are bonded together and said coil is operable to move with said vibrating member.

6. A vibration actuator as claimed in claim 1, further comprising a yoke and a plate, both connected to said permanent magnet, and a vertically flexible structure for supporting said permanent magnet, said yoke, and said plate relative to said fixed collision portion.

7. A vibration actuator as claimed in claim 6, further comprising a thin annular upper rubber member bonded in the vicinity of said fixed collision portion, and a flat lower rubber member around said yoke, wherein said vertically flexible structure is held between said thin annular upper rubber member and said lower rubber member at a plurality of points.

8. A vibration actuator as claimed in claim 6, further comprising:

a supporting section connected to said fixed collision portion; and a tubular rubber member between said supporting section and said yoke, wherein said supporting section and said tubular rubber member are operable to support said permanent magnet, said yoke, and said plate.

9. A vibration actuator as claimed in claim 6, further comprising:

a supporting section connected to said fixed collision portion; and a bellows-like rubber member between said supporting section and said yoke, wherein said supporting section and said bellows-like rubber member are operable to support said permanent magnet, said yoke, and said plate.

10. A vibration actuator as claimed in claim 6, further comprising:

a supporting section connected to said fixed collision portion; and a foam elastic member between said supporting section and said yoke, wherein said supporting section and said foam elastic member are operable to support said permanent magnet, said yoke, and said plate.

11. A vibration actuator as claimed in claim 6, further comprising a thin rubber member which supports a bottom of said yoke.

12. A vibration actuator as claimed in claim 6, further comprising a damper bonded to a central portion of said plate, wherein said permanent magnet, said yoke, and said plate are supported solely by said damper.

13. A vibration actuator as claimed in claim 6, further comprising:

an annular resinous molded member having a plurality of hook-like projections which project outside a diameter of said yoke, wherein said molded member is bonded to said fixed collision portion; and a rubber member which is attachable to said hook-like projections and which is operable to contact a bottom of said yoke so as to support said permanent magnet, said plate, and said yoke.

14. A vibration actuator as claimed in claim 13, wherein said coil has a diameter and includes a plurality of electrode wires, and said vibrating collision portion of said vibrating member is annular and has a diameter approximately equal to the diameter of said coil, said vibration actuator further comprises a damper located within the diameter of said vibrating collision portion of said vibrating member and connected to said vibrating collision portion of said vibrating member and to said plate, wherein one of said electrode wires of said coil passes between said vibrating collision portion of said vibrating member and said damper and is bonded, together with another of said electrode wires, to said annular resinous molded member.

15. A vibration actuator as claimed in claim 6, further comprising:

an annular resinous molded member having a plurality of hook-like projections which project outside a diameter of said yoke, wherein said molded member is bonded to said fixed collision portion;

a ring bonded to a bottom of said yoke and having a hook jutting out from a slit of said yoke; and a rubber member which is attachable to said hook-like projections of said annular resinous molded member and to said hook of said ring so as to support said permanent magnet, said plate, and said yoke.

16. A vibration actuator as claimed in claim 15, wherein said coil has a diameter and includes a plurality of electrode wires, and said vibrating collision portion of said vibrating member is annular and has a diameter approximately equal to the diameter of said coil, said vibration actuator further comprises a damper located within the diameter of said vibrating collision portion of said vibrating member and connected to said vibrating collision portion of said vibrating member and to said plate, wherein one of said electrode wires of said coil passes between said vibrating collision portion of said vibrating member and said damper and is bonded, together with another of said electrode wires, to said annular resinous molded member.

17. A vibration actuator as claimed in claim 1, further comprising means for applying to said coil a low-frequency electric signal having an alternating current and a dominant polarity which produce a driving force on said vibrating member in a direction away from said permanent magnet.

18. A vibration actuator as claimed in claim 17, wherein said means for applying is operable for applying to said coil a low-frequency electric signal having a signal slope which is more gradual than that of a square wave signal.

19. A vibration actuator as claimed in claim 17, further comprising:

a square wave signal generating circuit for generating a square wave signal;

an integrating circuit for integrating the square wave signal so as to produce a signal having a gradual signal slope; and a voltage to current converting circuit for voltage to current converting the signal having a gradual slope produced by said integrating circuit so as to produce the low-frequency electric signal.

20. A vibration actuator as claimed in claim 1, wherein said coil has a diameter and said vibrating collision portion of said vibrating member is annular and has a diameter approximately equal to the diameter of said coil.

21. A vibration actuator as claimed in claim 20, wherein said vibrating collision portion of said vibrating member is flat.

22. A vibration actuator as claimed in claim 21, further comprising a spiral damper located within the diameter of said vibrating collision portion of said vibrating member and connected to said vibrating collision portion of said vibrating member and said plate.

23. A vibration actuator as claimed in claim 20, further comprising a spiral damper located within a diameter of said vibrating collision portion of said vibrating member and connected to said vibrating collision portion of said vibrating member and said plate.

24. A vibration actuator as claimed in claim 23, wherein said vibrating collision portion of said vibrating member and said spiral damper are integrally molded using a resin.

25. A vibration actuator as claimed in claim 20, wherein said coil includes no winding bobbin and is bonded to said vibrating collision portion of said vibrating member.

26. A vibration actuator as claimed in claim 25, wherein said coil has a diameter and includes a plurality of electrode wires, and said vibrating collision portion of said vibrating member is annular and has a diameter approximately equal to the diameter of said coil, said vibration actuator further comprising a damper located within the diameter of said vibrating collision portion of said vibrating member and connected to said vibrating collision portion of said vibrating member and to said plate, wherein one of said electrode wires of said coil passes between said vibrating collision portion and said damper and is bonded, together with another of said electrode wires, to said annular resinous molded member.

27. A vibration actuator as claimed in claim 20, further comprising:

a centering device, having a circular hole therein, connected to said plate;

a damper, located inside a diameter of said vibrating collision portion of said vibrating member, having a slope such that a center portion of said damper is higher than said plate, wherein said center portion of said damper is fitted into said circular hole of said centering device and is bonded to said plate.

28. A vibration actuator as claimed in claim 1, further comprising a dome-shaped section connected to said vibrating member.

29. A vibration actuator as claimed in claim 1, further comprising an elastic member connected to said fixed collision portion, for controlling noises generated when said vibrating collision portion of said vibration member collides with said fixed collision portion.

30. A vibration actuator for use in effecting paging and for use with a fixed collision portion, said vibration actuator comprising:
   an electro-acoustic transducer including: a magnetic circuit having a permanent magnet and a coil; and a vibrating member movably mounted with respect to said permanent magnet for movement up and down relative to said permanent magnet;
   wherein said vibrating member includes a vibrating collision portion which is integrally movable with said vibrating member and which is operable to collide against the fixed collision portion during the up and down movement of said vibrating member, to thereby generate a vibration.

31. A vibration actuator as claimed in claim 30, wherein said coil and said vibrating member are bonded together and said coil is operable to move with said vibrating member.

32. A vibration actuator as claimed in claim 30, further comprising a yoke and a plate, both connected to said permanent magnet, and a vertically flexible structure for supporting said permanent magnet, said yoke, and said plate relative to the fixed collision portion.

33. A vibration actuator as claimed in claim 32, further comprising a thin annular upper rubber member to be bonded in the vicinity of the fixed collision portion, and a flat lower rubber member around said yoke, wherein said vertically flexible structure is held between said thin annular upper rubber member and said lower rubber member at a plurality of points.

34. A vibration actuator as claimed in claim 32, further comprising:
   a supporting section which is to be connected to the fixed collision portion; and
   a tubular rubber member between said supporting section and said yoke, wherein said supporting section and said tubular rubber member are operable to support said permanent magnet, said yoke, and said plate.

35. A vibration actuator as claimed in claim 32, further comprising:
   a supporting section which is to be connected to the fixed collision portion; and
   a bellows-like rubber member between said supporting section and said yoke, wherein said supporting section and said bellows-like rubber member are operable to support said permanent magnet, said yoke, and said plate.

36. A vibration actuator as claimed in claim 32, further comprising:
   a supporting section which is to be connected to the fixed collision portion; and
   a foam elastic member between said supporting section and said yoke, wherein said supporting section and said foam elastic member are operable to support said permanent magnet, said yoke, and said plate.

37. A vibration actuator as claimed in claim 32, further comprising a thin rubber member which supports a bottom of said yoke.

38. A vibration actuator as claimed in claim 32, further comprising a damper bonded to a central portion of said plate, wherein said permanent magnet, said yoke, and said plate are supported solely by said damper.

39. A vibration actuator as claimed in claim 32, further comprising:
   an annular resinous molded member having a plurality of hook-like projections which project outside a diameter of said yoke, wherein said molded member is to be bonded to the fixed collision portion; and
   a rubber member which is attachable to said hook-like projections and which is operable to contact a bottom of said yoke so as to support said permanent magnet, said plate, and said yoke.

40. A vibration actuator as claimed in claim 39, wherein said coil has a diameter and includes a plurality of electrode wires, and said vibrating collision portion of said vibrating member is annular and has a diameter approximately equal to the diameter of said coil, said vibration actuator further comprises a damper located within the diameter of said vibrating collision portion of said vibrating member and connected to said vibrating collision portion of said vibrating member and to said plate, wherein one of said electrode wires of said coil passes between said vibrating collision portion of said vibrating member and said damper and is bonded, together with another of said electrode wires, to said annular resinous molded member.

41. A vibration actuator as claimed in claim 32, further comprising:
   an annular resinous molded member having a plurality of hook-like projections which project outside a diameter of said yoke, wherein said molded member is to be bonded to the fixed collision portion;
   a ring bonded to a bottom of said yoke and having a hook jutting out from a slit of said yoke; and
   a rubber member which is attachable to said hook-like projections of said annular resinous molded member and to said hook of said ring so as to support said permanent magnet, said plate, and said yoke.

42. A vibration actuator as claimed in claim 41, wherein said coil has a diameter and includes a plurality of electrode wires, and said vibrating collision portion of said vibrating member is annular and has a diameter approximately equal to the diameter of said coil, said vibration actuator further comprises a damper located within the diameter of said vibrating collision portion of said vibrating member and connected to said vibrating collision portion of said vibrating member and to said plate, wherein one of said electrode wires of said coil passes between said vibrating collision portion of said vibrating member and said damper and is bonded, together with another of said electrode wires, to said annular resinous molded member.

43. A vibration actuator as claimed in claim 30, further comprising means for applying to said coil a low-frequency electric signal having an alternating current and a dominant polarity which produce a driving force on said vibrating member in a direction away from said permanent magnet.

44. A vibration actuator as claimed in claim 43, wherein said means for applying is operable for applying to said coil a low-frequency electric signal having a signal slope which is more gradual than that of a square wave signal.

45. A vibration actuator as claimed in claim 43, further comprising:

a square wave signal generating circuit for generating a square wave signal;

an integrating circuit for integrating the square wave signal so as to produce a signal having a gradual signal slope; and a voltage to current converting circuit for voltage to current converting the signal having a gradual slope produced by said integrating circuit so as to produce the low-frequency electric signal.

46. A vibration actuator as claimed in claim 30, wherein said coil has a diameter and said vibrating collision portion of said vibrating member is annular and has a diameter approximately equal to the diameter of said coil.

47. A vibration actuator as claimed in claim 46, wherein said vibrating collision portion of said vibrating member is flat.

48. A vibration actuator as claimed in claim 47, further comprising a spiral damper located within the diameter of said vibrating collision portion of said vibrating member and connected to said vibrating collision portion of said vibrating member and said plate.

49. A vibration actuator as claimed in claim 46, further comprising a spiral damper located within a diameter of said vibrating collision portion of said vibrating member and connected to said vibrating collision portion of said vibrating member and said plate.

50. A vibration actuator as claimed in claim 49, wherein said vibrating collision portion of said vibrating member and said spiral damper are integrally molded using a resin.

51. A vibration actuator as claimed in claim 46, wherein said coil includes no winding bobbin and is bonded to said vibrating collision portion of said vibrating member.

52. A vibration actuator as claimed in claim 51, wherein said coil has a diameter and includes a plurality of electrode wires, and said vibrating collision portion of said vibrating member is annular and has a diameter approximately equal to the diameter of said coil, said vibration actuator further comprising a damper located within the diameter of said vibrating collision portion of said vibrating member and connected to said vibrating collision portion of said vibrating member and to said plate, wherein one of said electrode wires of said coil passes between said vibrating collision portion and said damper and is bonded, together with another of said electrode wires, to said annular resinous molded member.

53. A vibration actuator as claimed in claim 46, further comprising:

a centering device, having a circular hole therein, connected to said plate;

a damper, located inside a diameter of said vibrating collision portion of said vibrating member, having a slope such that a center portion of said damper is higher than said plate, wherein said center portion of said damper is fitted into said circular hole of said centering device and is bonded to said plate.

54. A vibration actuator as claimed in claim 30, further comprising a dome-shaped section connected to said vibrating member.

55. A vibration actuator as claimed in claim 30, further comprising an elastic member to be connected to the fixed collision portion, for controlling noises generated when said vibrating collision portion of said vibration member collides with the fixed collision portion.

* * * * *